US011620917B2

(12) United States Patent
Kenny et al.

(10) Patent No.: US 11,620,917 B2
(45) Date of Patent: Apr. 4, 2023

(54) INTERNATIONAL STUDENT DELIVERY AND ENGAGEMENT PLATFORM

(71) Applicant: SHORELIGHT, LLC, Boston, MA (US)

(72) Inventors: Philip Kenny, Westborough, MA (US); Rudolf Christopher Hoehn-Saric, Somerville, MA (US); Daniel Grace, Wellesley, MA (US); Alyssa Gray, Beverly, MA (US); Duane Viazanko, Cambridge, MA (US)

(73) Assignee: Shorelight, LLC, Boston, MA (US)

( * ) Notice: Subject to any disclaimer, the term of this patent is extended or adjusted under 35 U.S.C. 154(b) by 259 days.

(21) Appl. No.: 16/008,950

(22) Filed: Jun. 14, 2018

(65) Prior Publication Data
US 2018/0366017 A1 Dec. 20, 2018

Related U.S. Application Data

(60) Provisional application No. 62/519,302, filed on Jun. 14, 2017.

(51) Int. Cl.
| G09B 5/10 | (2006.01) |
| G06Q 50/20 | (2012.01) |
| H04L 65/40 | (2022.01) |
| H04L 65/61 | (2022.01) |
| H04L 65/401 | (2022.01) |
| H04L 65/612 | (2022.01) |

(52) U.S. Cl.
CPC .............. *G09B 5/10* (2013.01); *G06Q 50/20* (2013.01); *H04L 65/4015* (2013.01); *H04L 65/61* (2022.05); *H04L 65/612* (2022.05)

(58) Field of Classification Search
CPC ...... G09B 5/10; G06Q 50/20; H04L 65/4015; H04L 65/4069; H04L 65/4084; H04L 65/61; H04L 65/612
See application file for complete search history.

(56) References Cited

U.S. PATENT DOCUMENTS

| 6,086,381 | A * | 7/2000 | Downs ..................... G09B 5/14 434/322 |
| 10,628,901 | B1 * | 4/2020 | Ancona ................. G06Q 50/205 |
| 2003/0041121 | A1 * | 2/2003 | Levine ..................... G09B 7/02 709/219 |
| 2004/0161728 | A1 * | 8/2004 | Benevento, II ...... G06Q 50/205 434/118 |
| 2007/0261080 | A1 * | 11/2007 | Saetti ..................... G09B 5/065 725/61 |

(Continued)

OTHER PUBLICATIONS

International Search Report and Written Opinion from PCT Patent App. No. PCT/US18/37621 (dated Sep. 17, 2018).

(Continued)

*Primary Examiner* — Eddy Saint-Vil
(74) *Attorney, Agent, or Firm* — Krishna Kalidindi

(57) ABSTRACT

A long-distance learning system includes an instruction studio and one or more remotely located classrooms for students. Each of the student's participation, academic performance, and use of digital resources for a class is evaluated in real time and assigned a color, so the instructor can easily assess each student's progress in the class when presented to the instructor in a display which is only for the instructor.

11 Claims, 17 Drawing Sheets

(56) References Cited

U.S. PATENT DOCUMENTS

| | | | | |
|---|---|---|---|---|
| 2008/0050715 | A1* | 2/2008 | Golczewski | G06Q 20/102 434/350 |
| 2008/0241810 | A1* | 10/2008 | Flores | G09B 5/00 434/350 |
| 2009/0317786 | A1* | 12/2009 | Alcorn | G09B 5/02 434/323 |
| 2010/0268686 | A1 | 10/2010 | Germany, II | |
| 2011/0050842 | A1* | 3/2011 | Saleh | H04N 7/15 348/14.08 |
| 2011/0307396 | A1* | 12/2011 | Hewitt | G06Q 10/10 705/317 |
| 2011/0314094 | A1* | 12/2011 | De Oliveira Antunes | G09B 7/00 709/203 |
| 2013/0004929 | A1* | 1/2013 | Otwell | G09B 5/00 434/350 |
| 2013/0216990 | A1* | 8/2013 | Chu | G09B 5/065 434/247 |
| 2013/0309648 | A1* | 11/2013 | Park | G09B 5/00 434/350 |
| 2013/0318469 | A1 | 11/2013 | Wessels | |
| 2013/0344469 | A1* | 12/2013 | Abrahamson | G09B 5/00 434/350 |
| 2015/0006425 | A1* | 1/2015 | Ayad | G09B 5/00 705/328 |
| 2015/0206448 | A1* | 7/2015 | Loudermilk | H04L 67/22 434/308 |
| 2015/0310757 | A1* | 10/2015 | Moon | G09B 7/04 434/350 |
| 2015/0312520 | A1* | 10/2015 | Nohria | G09B 5/06 434/350 |
| 2016/0073059 | A1* | 3/2016 | Bader-Natal | H04L 65/4038 348/14.03 |
| 2016/0189563 | A1* | 6/2016 | Fried | G09B 19/00 434/236 |
| 2016/0364995 | A1* | 12/2016 | Roddy | G06F 3/04815 |
| 2017/0004720 | A1* | 1/2017 | Ahuja | G09B 7/02 |
| 2017/0076622 | A1* | 3/2017 | Roberston | G09B 7/00 |
| 2017/0345109 | A1* | 11/2017 | Cejnar | G09B 7/00 |
| 2017/0358232 | A1* | 12/2017 | Adams | A61B 5/1118 |
| 2018/0122254 | A1* | 5/2018 | Rangan | H04N 7/142 |
| 2018/0316893 | A1* | 11/2018 | Rosenberg | H04L 65/403 |
| 2019/0012046 | A1* | 1/2019 | Marzouk | G06F 3/0482 |
| 2020/0051459 | A1* | 2/2020 | Tennyson | G09B 9/08 |
| 2020/0135045 | A1* | 4/2020 | Alyuz Civitci | G06K 9/00315 |

OTHER PUBLICATIONS

Extended European Search Report issued in European App. No. 18817635.8 dated Mar. 11, 2021 (8 pp.).

* cited by examiner

INTERNATIONAL STUDENT DELIVERY AND ENGAGEMENT PLATFORM

BACKGROUND

Field of Endeavor

The present invention relates to devices, systems, and processes useful as distance learning systems and methods.

Brief Description of the Related Art

The existing problem addressed and remedied by the subject matter described herein includes the inability to replicate the live classroom experience for distance learning students, including international students, who are participating in lectures and coursework through an online delivery model.

SUMMARY

According to a first aspect of the invention, a system for summarizing and presenting a student's participation level, academic performance, and use of digital learning resources in an academic course taught in a distance learning environment, comprised of a P-module configured to evaluate student participation data of students enrolled in said course, an A-module configured to evaluate student academic performance data of students enrolled in said course, a D-module configured to evaluate student use of digital learning resources data of students enrolled in said course, and an attention indicator module configured to generate a display of data concerning at least one student who indicated that they wish to be called upon by an instructor of said course (akin to a raised hand in a traditional classroom setting), wherein said attention indicator module is configured to generate two different displays of a subset of the course roster for which at least one student has indicated that they wish to be called upon, a first of said two displays including P-, A-, and D-colors for said at least one student, and a second of said two displays not including P-, A-, and D-colors for said at least one student.

In such a system, each of said P-, A-, and D-modules assigns a color to said student based on each evaluation.

Such a system can further comprise a roster module configured to generate a display of the entire enrollment in said course, including students from more than one remote classroom.

In such a system, said roster module is further configured to generate a display of a classroom roster for all the enrolled students in a single remote classroom.

In such a system 1, said attention indicator module is further configured to display said first of said two displays including P-, A-, and D-colors for said at least one student only to an instructor of said course, and display said second of said two displays in a remote classroom to said students.

In such a system, said student academic performance data includes only data for said academic course.

Such a system can further comprise a camera configured to stream image data of a course instructor, and wherein said first of said two displays is positioned immediately adjacent to said camera, whereby when the course instructor looks at said camera, said first of said two displays is a heads-up display for the instructor.

Still other aspects, features, and attendant advantages of the present invention will become apparent to those skilled in the art from a reading of the following detailed description of embodiments constructed in accordance therewith, taken in conjunction with the accompanying drawings.

BRIEF DESCRIPTION OF THE DRAWINGS

The invention of the present application will now be described in more detail with reference to exemplary embodiments of the apparatus and method, given only by way of example, and with reference to the accompanying drawings, in which FIG. 1 diagrammatically illustrates an instruction studio including one or more instructors;

FIG. 3 illustrates an exemplary roster display to the instructor(s);

FIG. 4 illustrates a single remote classroom roster view to the instructor(s);

FIG. 5 illustrates a view of a single student's record from the roster;

DETAILED DESCRIPTION OF EXEMPLARY EMBODIMENTS

Figure 1:
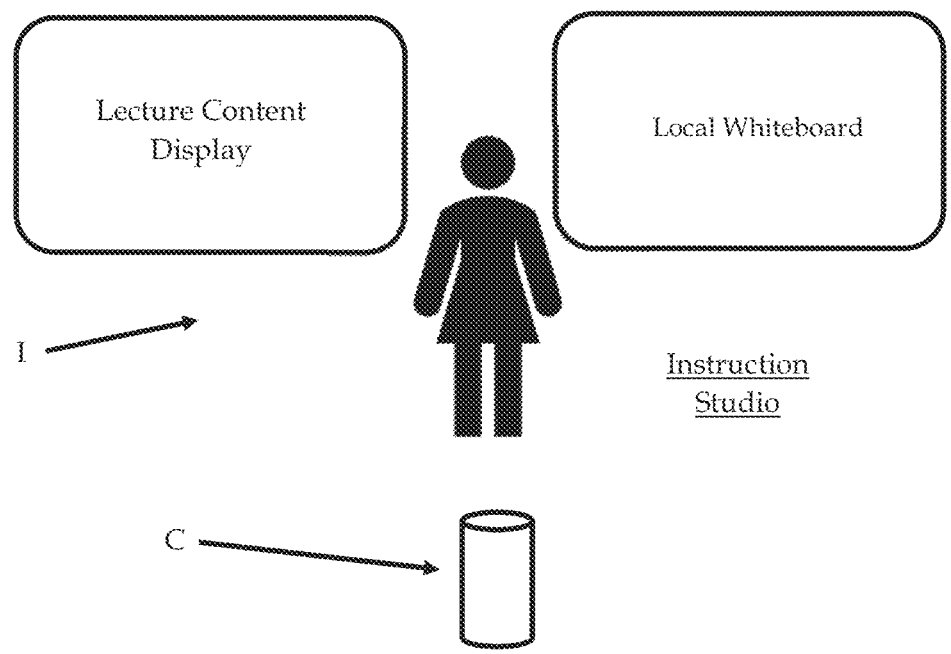

Referring to the drawing figures, like reference numerals designate identical or corresponding elements throughout the several figures.

The singular forms "a," "an," and "the" include plural referents unless the context clearly dictates otherwise. Thus, for example, reference to "a solvent" includes reference to one or more of such solvents, and reference to "the dispersant" includes reference to one or more of such dispersants.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited.

For example, a range of 1 to 5 should be interpreted to include not only the explicitly recited limits of 1 and 5, but also to include individual values such as 2, 2.7, 3.6, 4.2, and sub-ranges such as 1-2.5, 1.8-3.2, 2.6-4.9, etc. This interpretation should apply regardless of the breadth of the range or the characteristic being described, and also applies to open-ended ranges reciting only one end point, such as "greater than 25," or "less than 10."

The inventors herein have identified an optimal set of solutions for asynchronous content delivery, giving educators an opportunity to better serve distance learning students, including international students, and instructors engaged in a live lecture experience. As described herein, the systems and methods herein can provide a personalized delivery, engagement and management platform for instructors and international students participating in a U.S. higher education experience. The systems and methods provide solutions to multiple audiences and supports variable delivery approaches (e.g., synchronous and asynchronous content delivery). A primary example of the use is in an online medium, delivering synchronous content to, e.g., international students in a transnational, live lecture format. The systems and methods leverage a bundled environment of audio, video, and software platform tools to support students, instructors, academic and student support teams in a geographically distributed manner. The result is a streamlined, engaging experience for students in remote locations—interacting in real-time with instructors who are located elsewhere, e.g., in the U.S.

Core components can include the following:
Instructor tools designed to provide near real-time updates on individual student information, status, and activity.
Student tools designed to provide seamless interaction with instructors and other students.
Integration of camera and smart board technology, tied to classroom engagement.
Points of Differentiation of the subject matter described herein from prior systems and methods include, but is not limited to:
"Roster" Tool: The Roster Tool enables instructors to do the following:
View all of his/her students
Sort by selected criteria, including location, class
View phonetic spelling of students' names (especially important for international students)
Gain access to PAD score (see below)
Access student-specific details:
Notes from academic and student success teams
Ability to mark students as participated and absent
View last participated date
View last assignment submitted
View email and other biographical information
Send messages to students
Access students' grades
An Attention Indicator (which can be a "Hand Raise") Tool: The Attention Indicator Tool enables instructors to do the following:
View students that have digitally 'raised their hands' on studio broadcast machines
Along with an indication that one or more of the students enrolled in the course wants to get the instructor's attention, e.g., to be called upon, which in some contexts may take the form of a digital 'hand raise', and number of students that have raised hands, a teleprompter at the bottom of studio broadcast machines will provide PAD scores, which is a display different from a display that includes the content that the instructor shares with the students, e.g., via screen sharing or the like.
PAD score: A tool for "PAD" score algorithm and monitoring. PAD is an acronym for "Participation, Academic, Digital." Each component of PAD is configurable, and negative status changes will trigger notifications to instructors. PAD scores are represented by Grey/Green/Yellow/Red indicators.

P=Participation in class. A configurable algorithm will trigger a status/color change after a certain number of classes are missed.
A=Academic. This is tied to grades that are submitted to the Learning Management System. Grades are tiered by configurable buckets.
D=Digital. This represents engagement with the platform and provides validation of post-work (e.g., homework) from a prior lesson and pre-work (e.g., reading assignment) for an upcoming class.

Engagement tools: includes capabilities to provide instructors with a more personalized and streamlined experience, including:
Short answer questions—Ability to apply tags to questions and to manage questions in small groups within a class.
Polls—Ability to apply tags to poll questions, manage standard set of poll questions (enhanced authoring capabilities), and connect to a visualization tool for response management.

Translation services and localized support: incorporation of simultaneous translation abilities via close caption into the delivery service. Based upon location of student, academic content is translated in a differentiated manner. A packaged, multilingual student services management tool can be used by local staff and third parties to administer in-country support.

Figure 2:
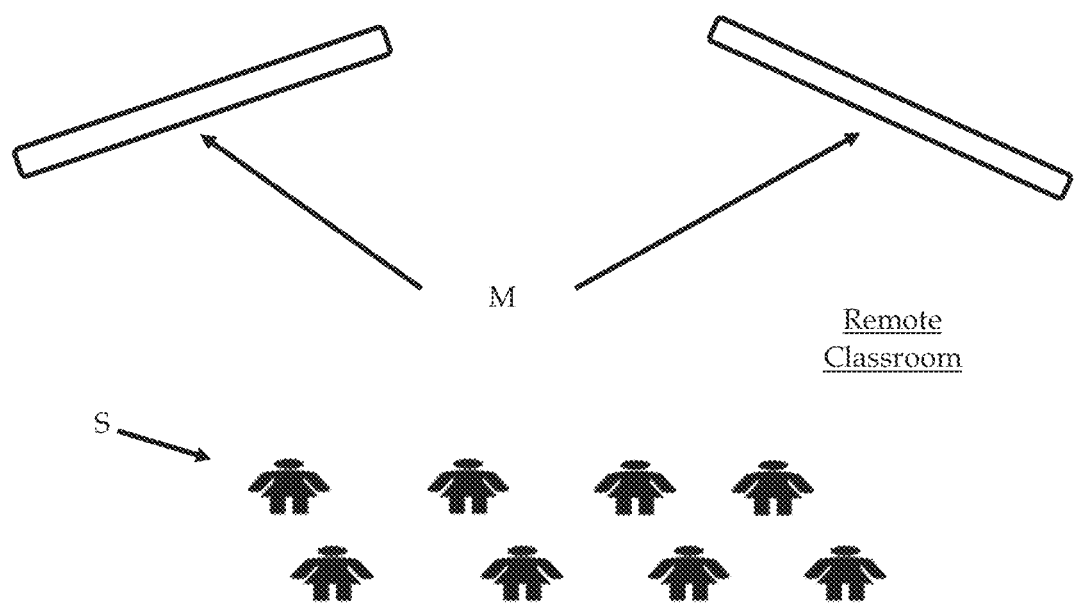
FIG. 2 diagrammatically illustrates a remote classroom including one or more students.

FIG. 1 diagrammatically illustrates an instruction studio in which one or more instructors lead a course class, while FIG. 2 diagrammatically illustrates a remote classroom in which one or more students are present. The instruction studio includes one or more cameras, and can include displays for lecture content, a whiteboard, and other teaching tools. The image of the instructor from the camera, as well as image data from the lecture content display, whiteboard, and/or any of the other teaching tools, is transmitted to the remote classroom of FIG. 2, and displayed in the remote classroom on or more monitors; the displays in the remote classroom, if more than one is provided, can be mirrored or different, e.g., one display of the instructor and another display of the image data from the lecture content display of FIG. 1.

One of the difficulties addressed by the subject matter of this disclosure is that the instructor must often, during a lecture, review the subject matter of the lecture content display (e.g., text, images, video, slide decks, etc.) from which they are teaching, while also reviewing a separate display of data records concerning the students—who has raised their hands in the remote classroom, and what is the history of those students in the particular course, in terms of past participation, academic success, and use of digital resources for the course (e.g., pre-work and home work), among other data. The systems and methods described herein separate those two displays, so the instructor can share a lecture content display with the remote classroom, while keeping private (or, rather, keeping from the students' view) the data concerning the students PAD scores.

Figure 3:
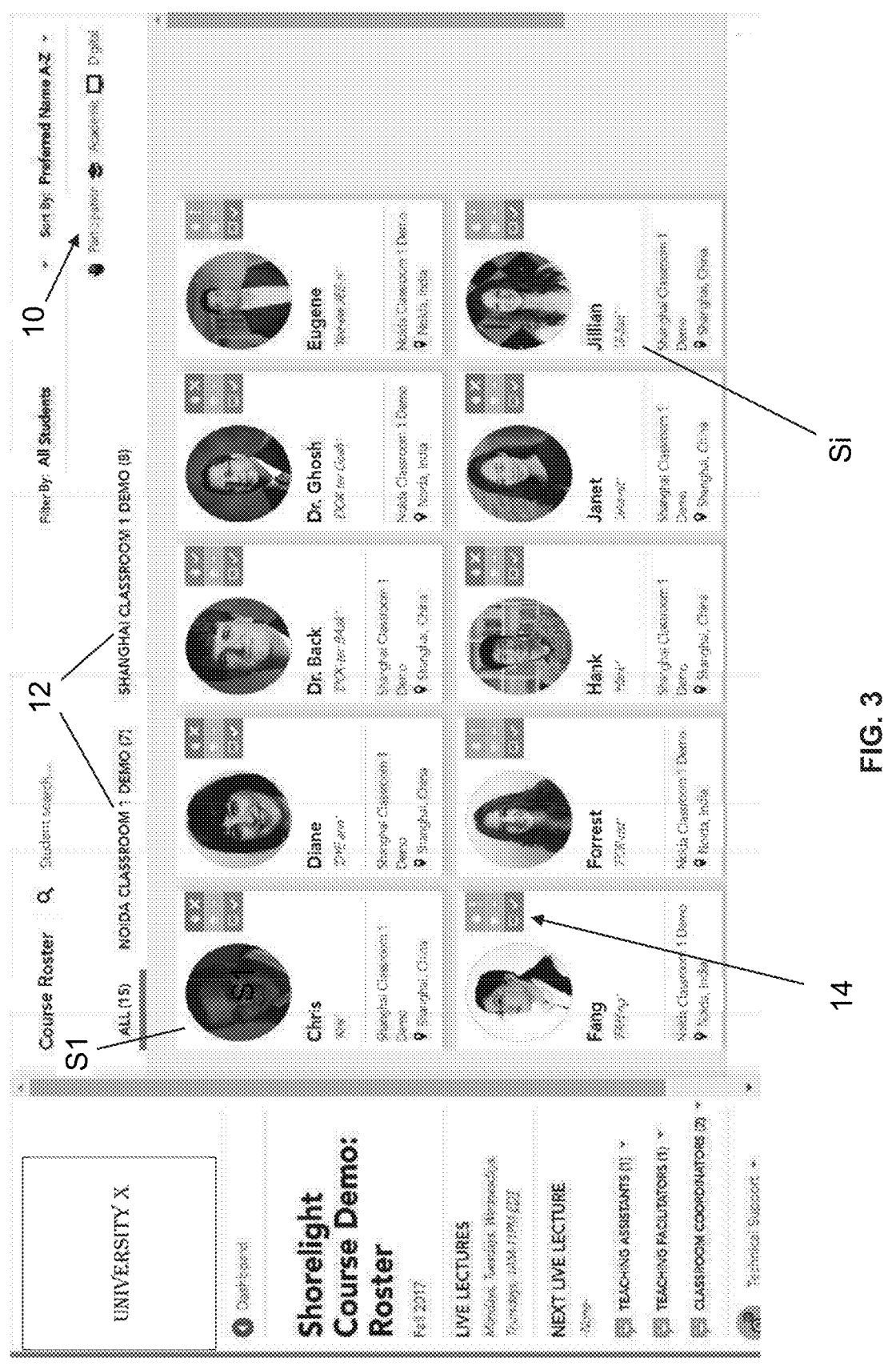

FIG. 3 illustrates an exemplary class roster display for the instructor. The system displays class roster record elements for each student S1 . . . Si, for all remote classrooms 12 that are at that time being held. A set of PAD selection buttons 10 on the display permit the instructor to sort, based on the real-time data at the time the button is selected, the PAD data for the class, while each student's record element includes a set of PAD indicators, which are advantageously, but not necessarily, color coded as described elsewhere herein. Thus, the class roster display provides the instructor useful data in a single view, including: name, face, pronunciation of name (phonetically, for the language of the instructor), and a 'heat-meter' about the students in the form of PAD color designations. This can be an indication of the student's learning style, e.g., active or passive, which in turn helps the instructor to prioritize who to call upon. The class roster view also gives a visual indication to quickly find a student. As discussed in greater detail below, the inclusion of a non-numerical indication of each student's PAD scores give the instructor alerts based on each student's course participation, which can include live interaction measures; academic progress, which includes the student's grades (i.e., is the student keeping up or passing the class or falling behind); and how digitally active each student is, e.g., a metric which tracks each time the student logged in, submitted work, posted messages to a course forum, downloaded content, etc.

Further optionally, the roster can include elements for each student's record based on a gamification of the course, e.g., badges, making the course more social, such as star ratings, optional feedback to the instructor or institution, indicators of country pride, social rank within the class based on each student's history of challenging/speaking up/leading, or even corporate sponsorship of the course. By way of a non-limiting example, for an electrical engineering course taught using the system described herein, a badge theme could be implemented that relates to, oriented to, electrical engineering oriented symbols could be assigned to each student based on that student's PAD score characteristics, such as a diode, transistor, capacitor, SCR, MOSFET, integrated circuit, resistor, and/or different voltages or wattages.

The table below summarizes exemplary logic, according to one embodiment as described herein, which can be used to determine a single student's PAD score on the fly, using the data stored in the system at the time the system displays the scores.

TABLE 1

| PAD Score logic | |
|---|---|
| Participation | |
| Gray | No data |
| Green | student did not participate in 0 to 3 live lectures |
| Yellow | student did not participate in 4 to 5 live lectures |
| Red | student did not participate in 6 or more live lectures |
| Academic | |
| Gray | No data |
| Green | student's total grade is 90 and above |
| Yellow | student's total grade is 80 to 89 |
| Red | student's total grade is 79 and below |
| Digitally Active | |
| Gray | No data |
| Green | Top X% of 125 combinations, for example: student Completed the pre-work of Current Lesson or Next Lesson |
| Yellow | Middle 100 − (X + Y)% of 125 combinations, for example: student is In Progress with the pre-work in Current Lesson or Next Lesson |
| Red | Bottom Y% of 125 combinations, for example: student has Not Started the pre-work on Current Lesson or Next Lesson |

TABLE 1-continued

| PAD Score logic | | |
|---|---|---|
| Checks the state of previous, current, and next lesson (125 possible combinations) | | |
| Previous Lesson | Current Lesson | Next Lesson |
| None | None | None |
| No Prework | No Prework | No Prework |
| Not Started | Not Started | Not Started |
| In Progress | In Progress | In Progress |
| Completed | Completed | Completed |

Thus, as indicated in Table 1, each of the Participation, Academic, and Digital scores for each student is calculated in real time, and assigned a symbolic designation instead of a numerical designation; according to the advantageous embodiment in Table 1, those designations are the colors grey (no data), green (high scores), red (low scores), and yellow (between green and red). While other systems of non-numeric symbols can also be used, the use of the well-known green-yellow-red system provides a fast indicator to the instructor concerning each student's achievements to-date in the course.

Figure 4:
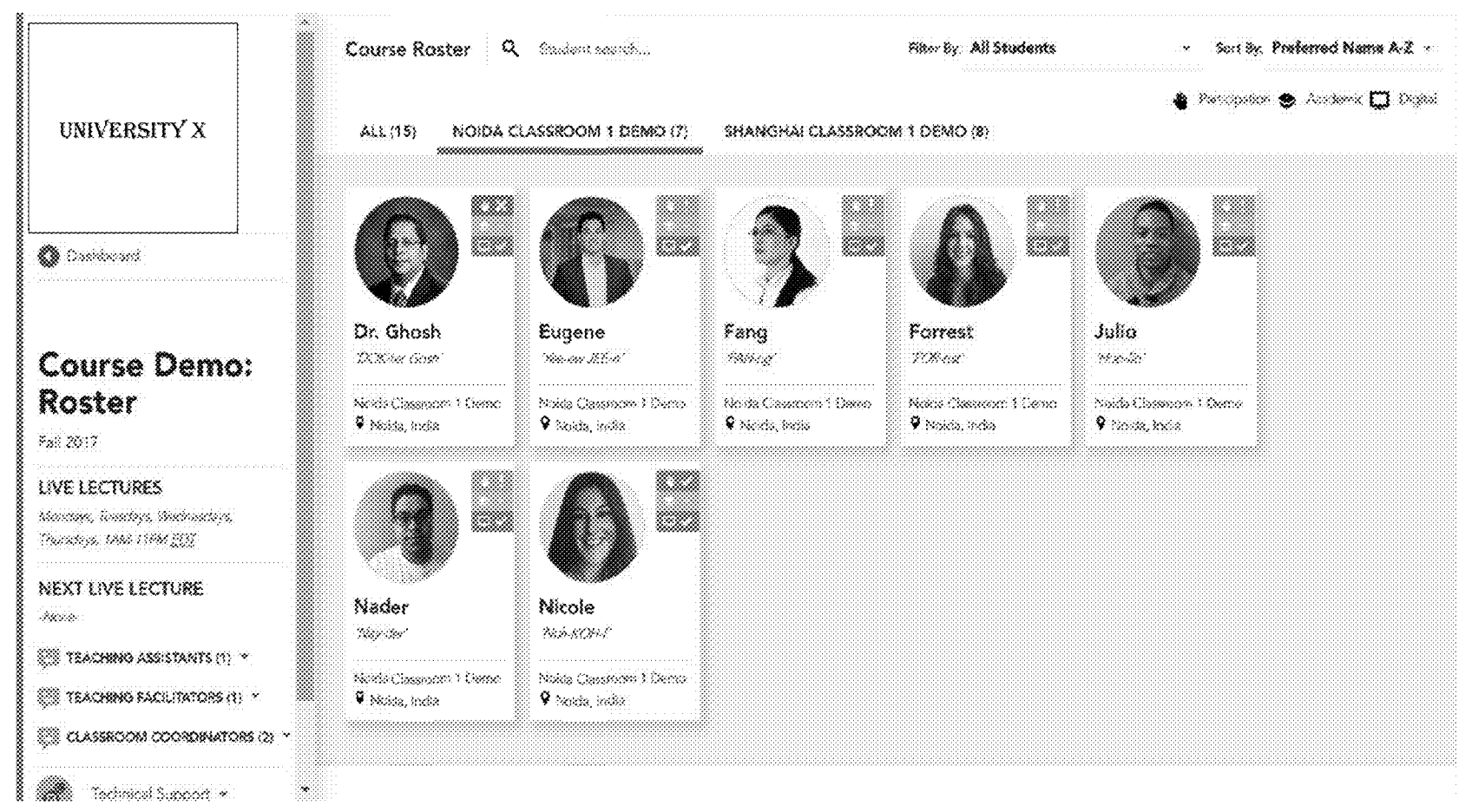
Figure 5:
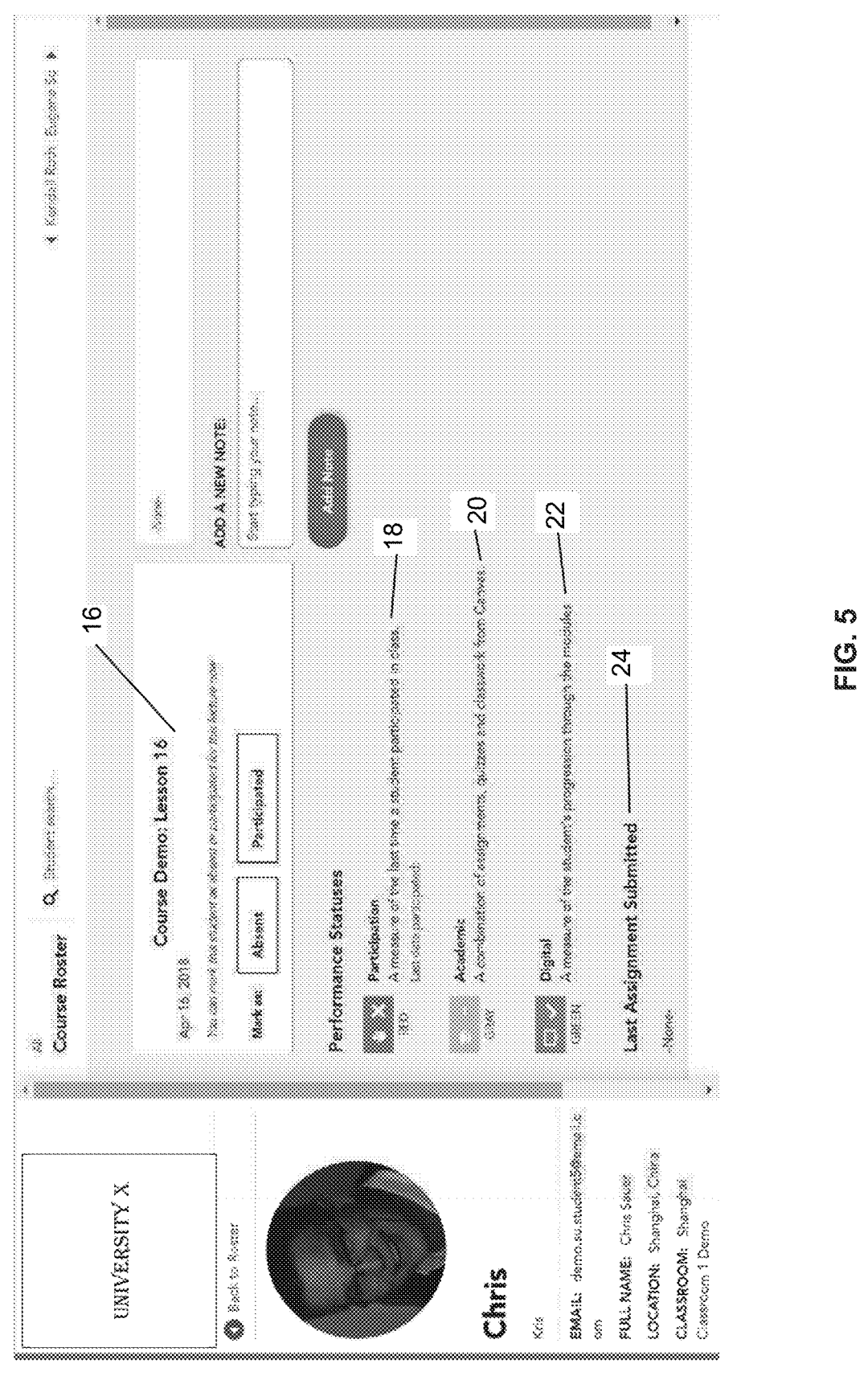
Figure 6:
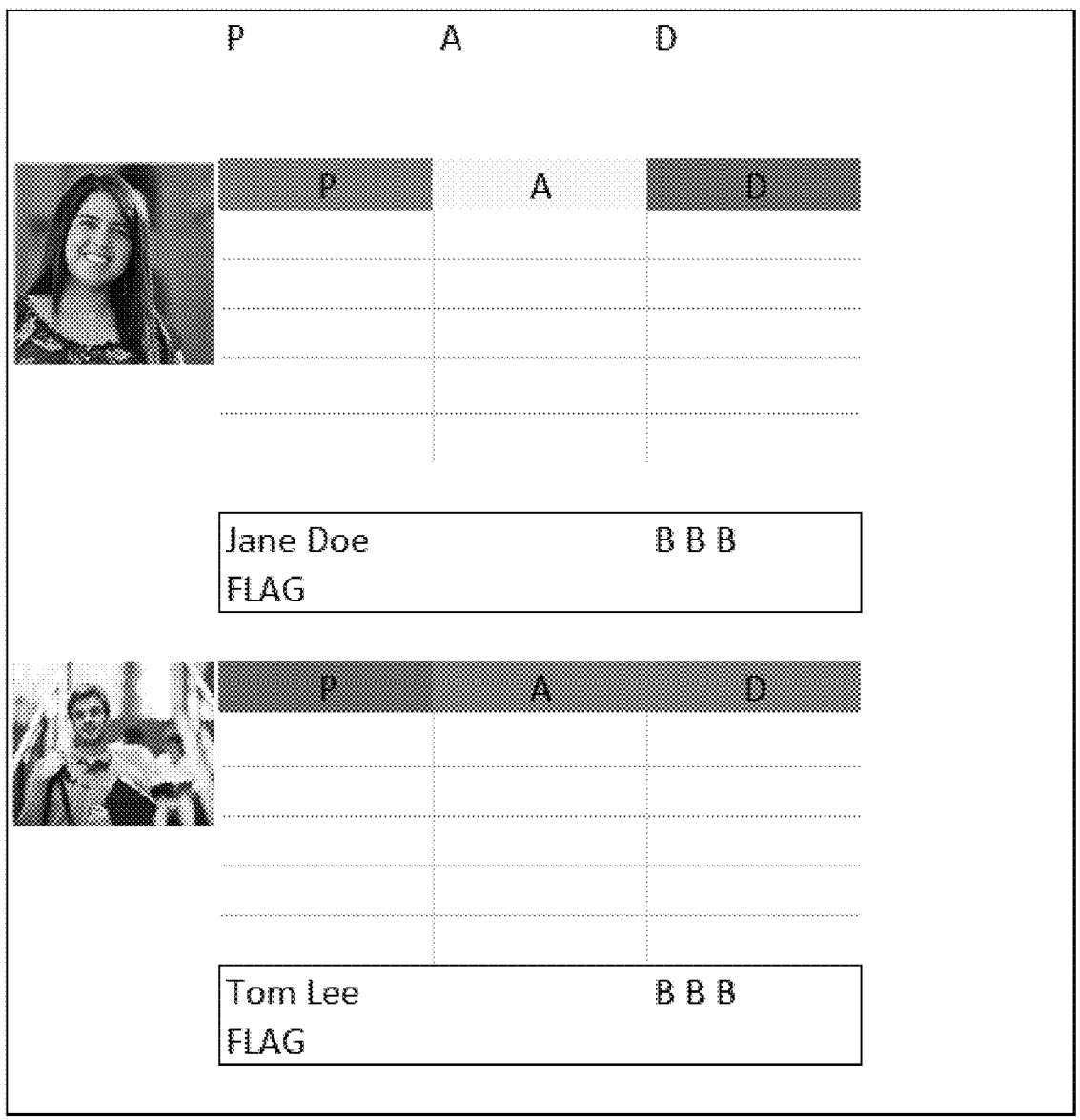
FIG. 6 illustrates an alternative view of a single remote classroom roster view to the instructor(s)

FIG. 4 illustrates an instructor display view similar to that of FIG. 3, for a single classroom of multiple simultaneously held remote classrooms for a single course. FIG. 5 illustrates a further level of granularity, being an instructor display view of a single student's record, which can include sections permitting the instructor to mark the student absent/participated, and separate display sections for each of the PAD scores, with their color/symbol indicators, as well as any other information the instructor may want to include for the course. FIG. 6 illustrates an alternative embodiment of a roster view for an instructor.

Figure 7:
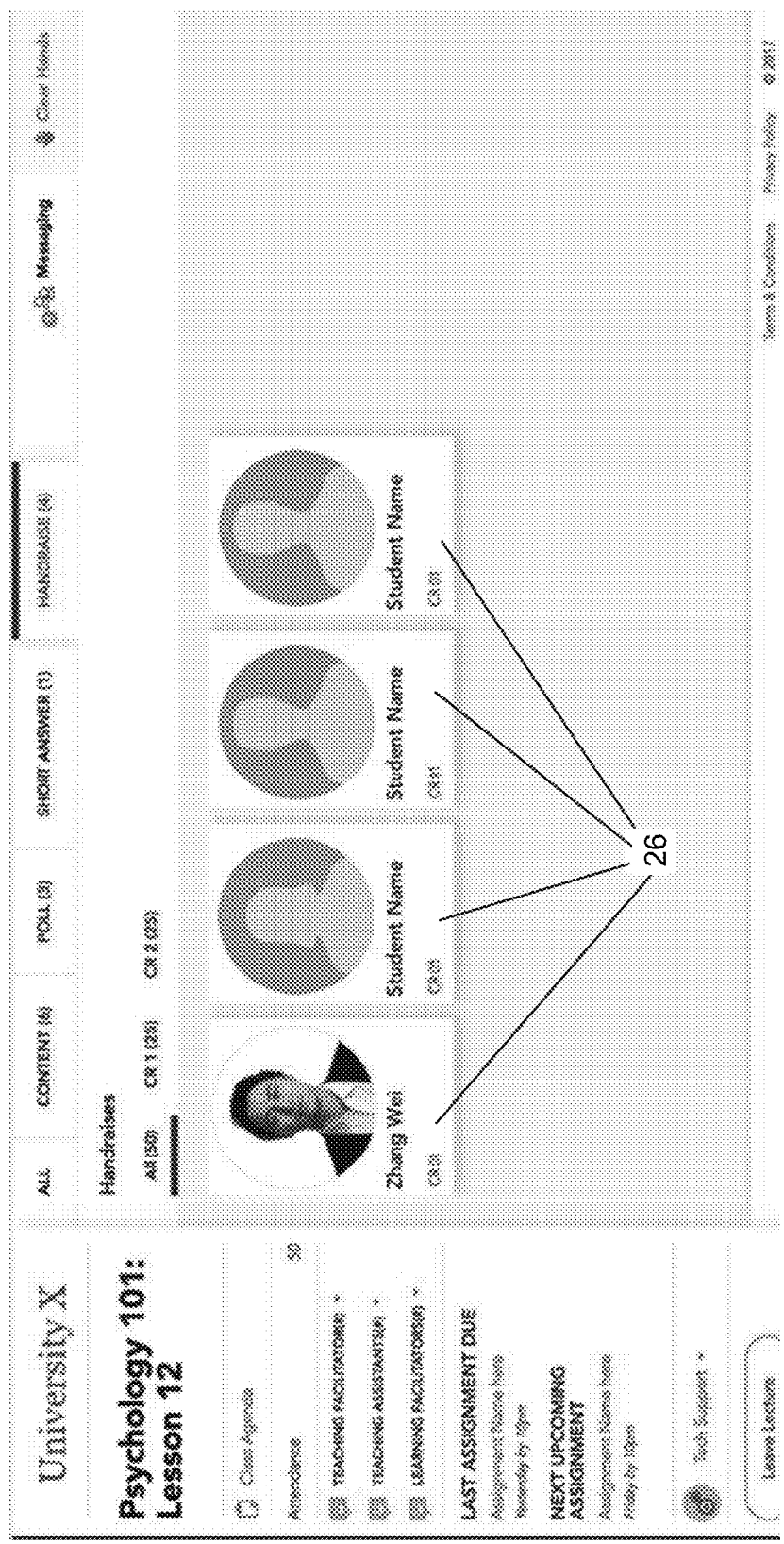
FIG. 7 illustrates an attention indicator or "hand raise" view display to the instructor(s)

FIG. 7 illustrates an attention indicator or 'hand raise' instructor view, which does not include any PAD score information, and which is therefore more suitable for sharing by the instructor with the classroom(s). More specifically, the system described herein generates two separate and separable views for the instructor, which are advantageously presented in different shells, windows, displays, or combinations thereof. In this manner, one of the views does not include information about any student that is private, such as any of the PAD scores and/or colors, and is therefore suitable for sharing by the instructor with the entire class, while the other view includes that excluded, more private data, including PAD scores and/or colors, and is therefore not shared with the remote classrooms. As discussed elsewhere herein, the attention indicator instructor view presents data elements 26 for each student who at that time has, using a corresponding portion of the system hereof that is accessible to each student, e.g., via a webpage rendered in a browser running on a computing device (laptop, tablet, mobile phone, etc.), into which the student has logged in for the particular course, a 'raise hand' button to indicate that the student wishes to be called upon by the instructor. The system hereof communicates the student's indication that they wish to be called up, which can be a hand raise toggle indication, to the portion of the system which manages the displays at the instruction studio, to notify the instructor that the particular student has, virtually, raised their hand. The system also updates the student's PAD scores, in real time, to account for the student' hand raise. The instructor's attention indicator view is revised in real time to include data elements for students who have newly virtually raised their hands, and removes those who have 'taken their hand down' by toggling the button in their application, and removes those who have been called upon by the instructor.

Figure 8:
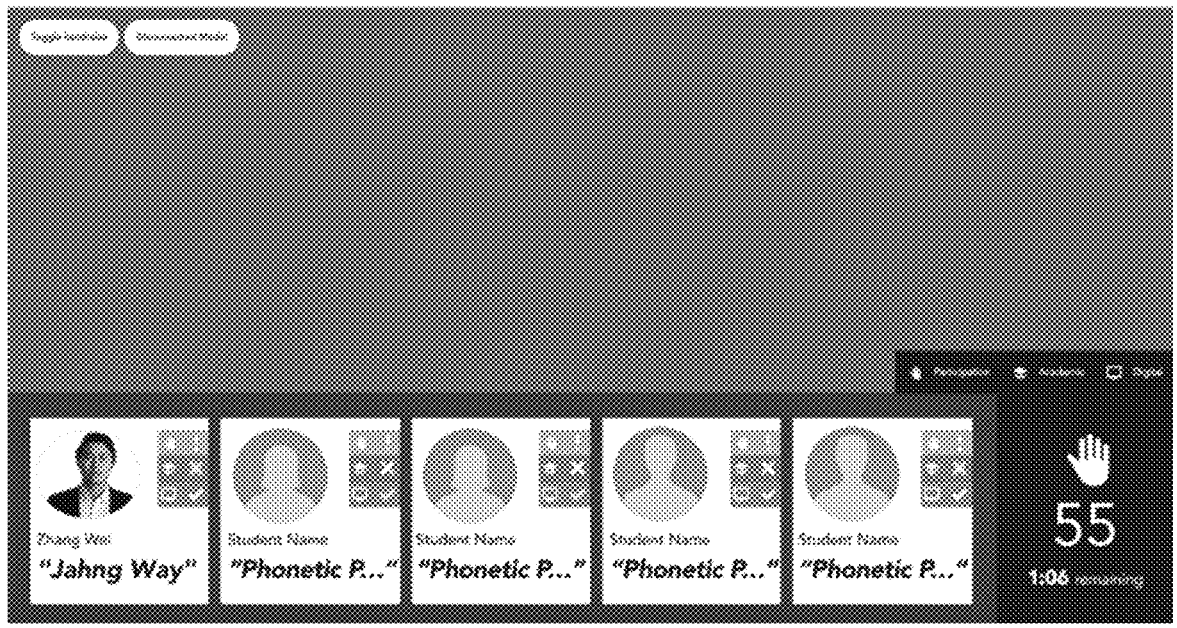
FIG. 8 illustrates a separate attention indicator or "hand raise" view display to the instructor(s), which includes PAD scores.
Figure 9:
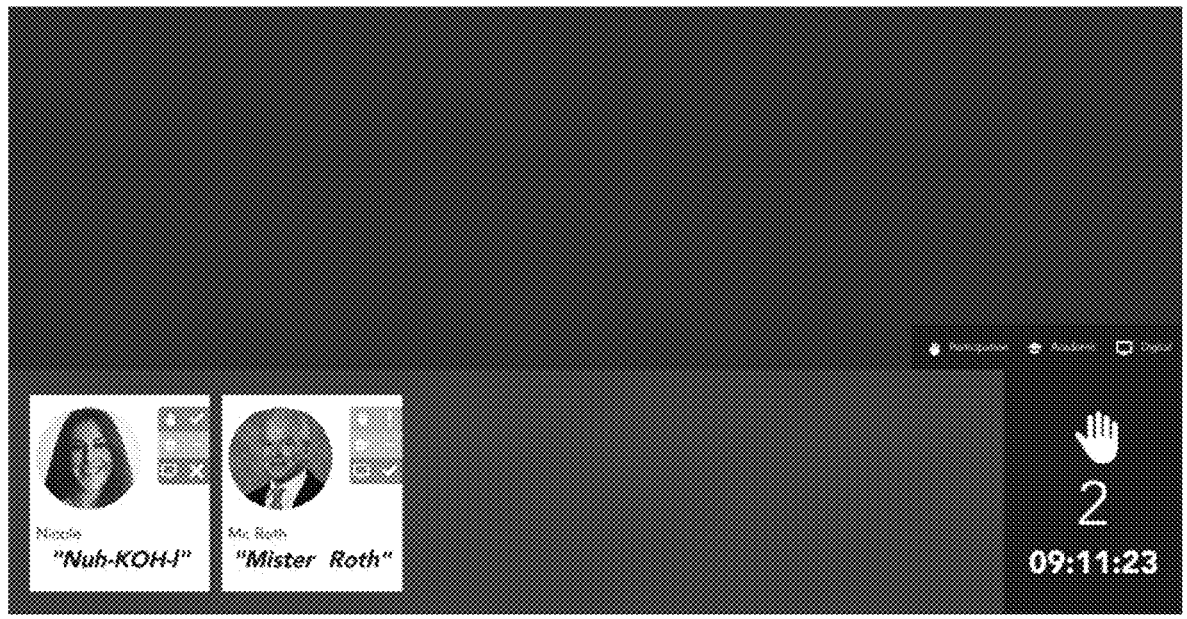
FIG. 9 illustrates a view similar to that of FIG. 8, for a single remote classroom.

FIGS. 8 and 9 illustrate exemplary instructor-only views of an attention indicator view, which include PAD score indicators as discussed elsewhere herein. The instructor-only views reflect the hands raised during a live lecture. Advantageously, the instructor-only views are presented on a monitor that is physically positioned behind or immediately adjacent to the camera illustrated in FIG. 1. In this way, the instructor can see 'hands raised' in both of the instructor views, which helps the instructor keep eye contact with class, by looking at the monitor that is close to the camera, and not keep looking at the monitor displaying the sharable content, e.g., their computer. Also, the physical positioning of the camera and the display makes the display act as a "heads up display", because when the instructor looks at the camera, the display is in the same field of view, and vice versa. This physical placement can give the distance learning experience a much more personal feel, which can be important to both the instructor and the students. As discussed above, the view illustrated in FIGS. 8 and 9 show the PAD scores, since it can't be displayed during class, while the indication that the student wishes to be called up in the shared portion of the system only show picture, name, and no PAD score, as the instructors can show that view (e.g., their computer) during class.

Personal data privacy is protected in many jurisdictions around the world, and in educational systems, sharing of a student's personal data is oftentimes highly restricted or prohibited. In the U.S., for example, the Family Educational Rights and Privacy Act (FERPA) prohibits, among other things, an educational institution from sharing a student's academic records with most other entities and persons (except the student and the student's parent(s) or guardian(s)), unless the student grants a specific waiver of that privacy right to have their records released to a specific entity (in the U.S., sometimes referred to as a "FERPA waiver"). In the context of the present systems and methods, this means that a student's actual academic record cannot (without a waiver) be used when calculation PAD scores; however, the student's actual, real-time progress in a particular course, which is known to the course instructor because the instructor personally assigned grades and taught class sessions in which the student participated, is not private with respect to that course instructor, and thus can be used in determining PAD scores in real time during a class session, and differentially displaying students' PAD scores to the instructor only, and not to the students in the class. In this way, systems and methods described herein can provide the instructor with important indicators of a student's progress and performance in the course, while still respecting each student's data privacy.

Figure 10:
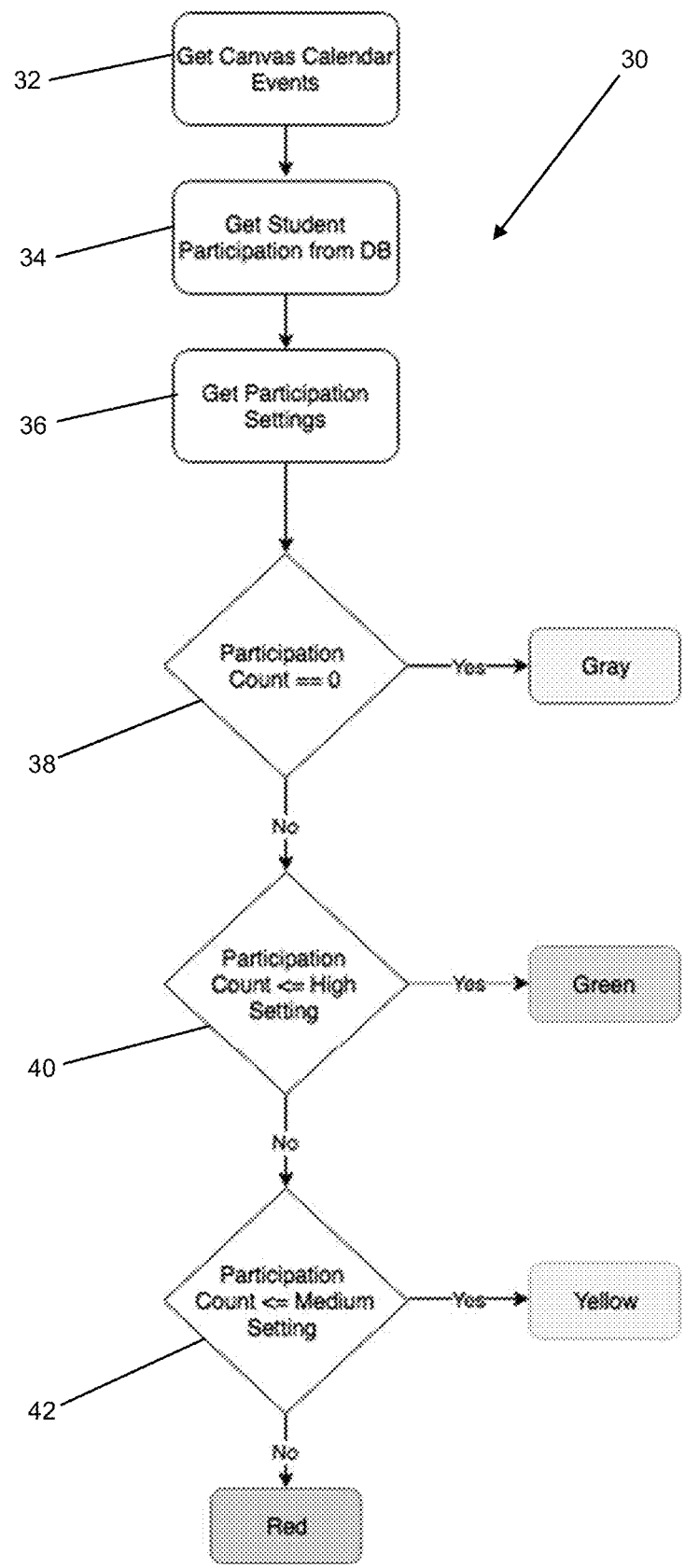
FIG. 10 illustrates an exemplary process for determining a participation score for a student.

FIG. 10 illustrates an exemplary process 30 for determining a participation score ("P") for a student. The process begins by retrieving 32, from a database, data indicative of class calendar events (CANVAS is a commonly used academic data management system; others can be used), and proceeds to retrieving 34, data indicative of student participation in each of the calendar events from a database. Participation settings (see below) for the particular course are then retrieved 36 from a database. If the student's actual participation count is zero (step 38), then the student's P score is assigned the color grey. If the student's actual participation count is not zero, the student's participation count is compared 40 to the high setting, retrieved in step 36; if the student's actual participation count is less than or equal to the high setting, then the student's P score is assigned the color green. If not, the student's participation count is compared 42 to the medium setting, retrieved in step 36; if the student's actual participation count is less than or equal to the medium setting, then the student's P score is assigned the color yellow; otherwise, the student's P score is assigned the color red. Data indicative of the assigned color for the particular student is then stored for the class session, and the system displays that color as described elsewhere herein for the particular student.

Figure 11:
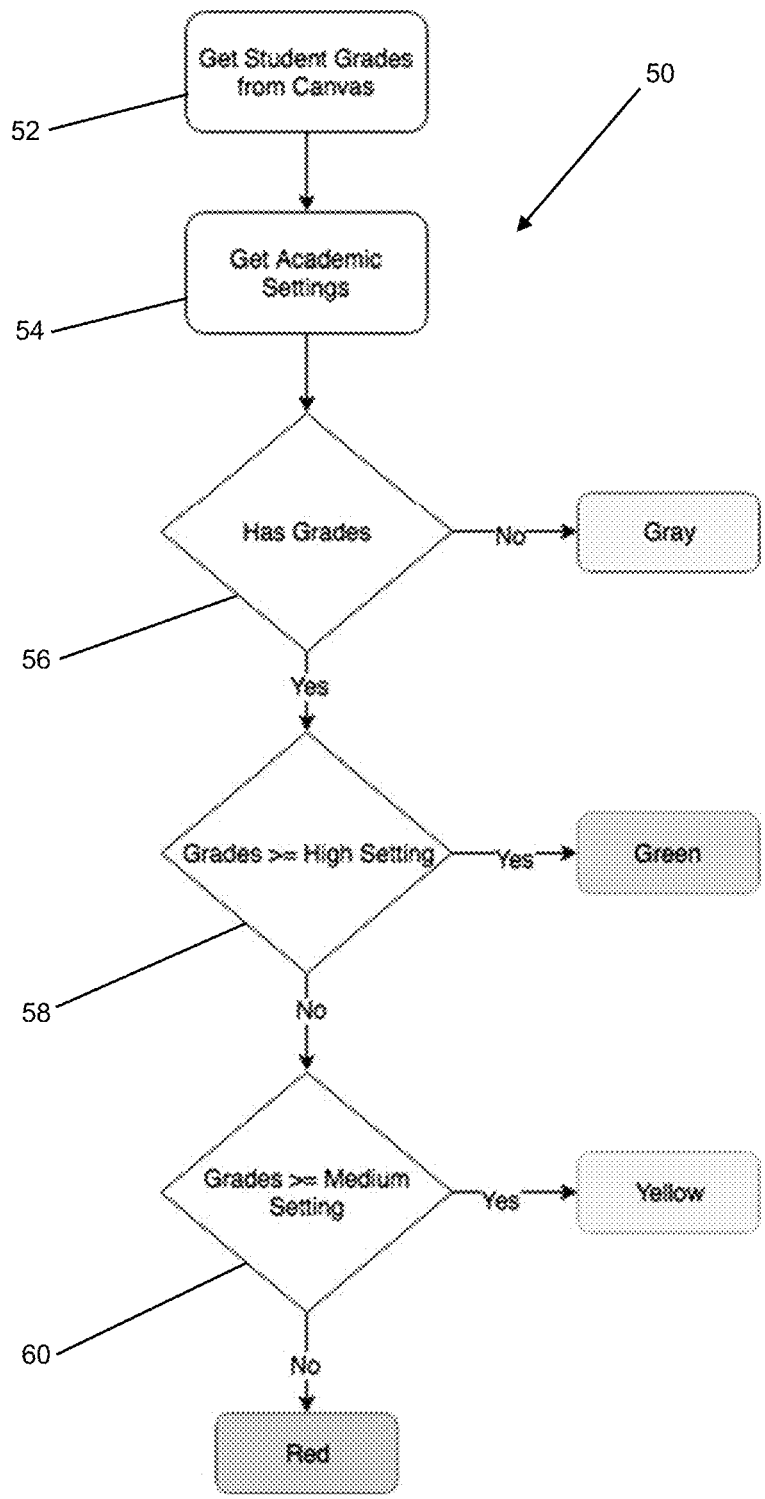
FIG. 11 illustrates an exemplary process for determining an academic score for a student.

FIG. 11 illustrates an exemplary process 50 for determining an academic score ("A") for a student. The process begins by retrieving 52, from a database, data indicative of a student's grades in the particular course (CANVAS is a commonly used academic data management system; others can be used), and proceeds to retrieving 54 data indicative of academic settings (see below) for the particular course from a database. If the student has no grades (step 56), then the student's A score is assigned the color grey. If the student has grades in the course, the student's grades are compared 58 to the high setting, retrieved in step 54; if the student's grades are greater than or equal to the high setting, then the student's A score is assigned the color green. If not, the student's grades are compared 60 to the medium setting, retrieved in step 54; if the student's actual grades are greater than or equal to the medium setting, then the student's A score is assigned the color yellow; otherwise, the student's A score is assigned the color red. Data indicative of the assigned color for the particular student is then stored for the class session, and the system displays that color as described elsewhere herein for the particular student.

Figure 12A:
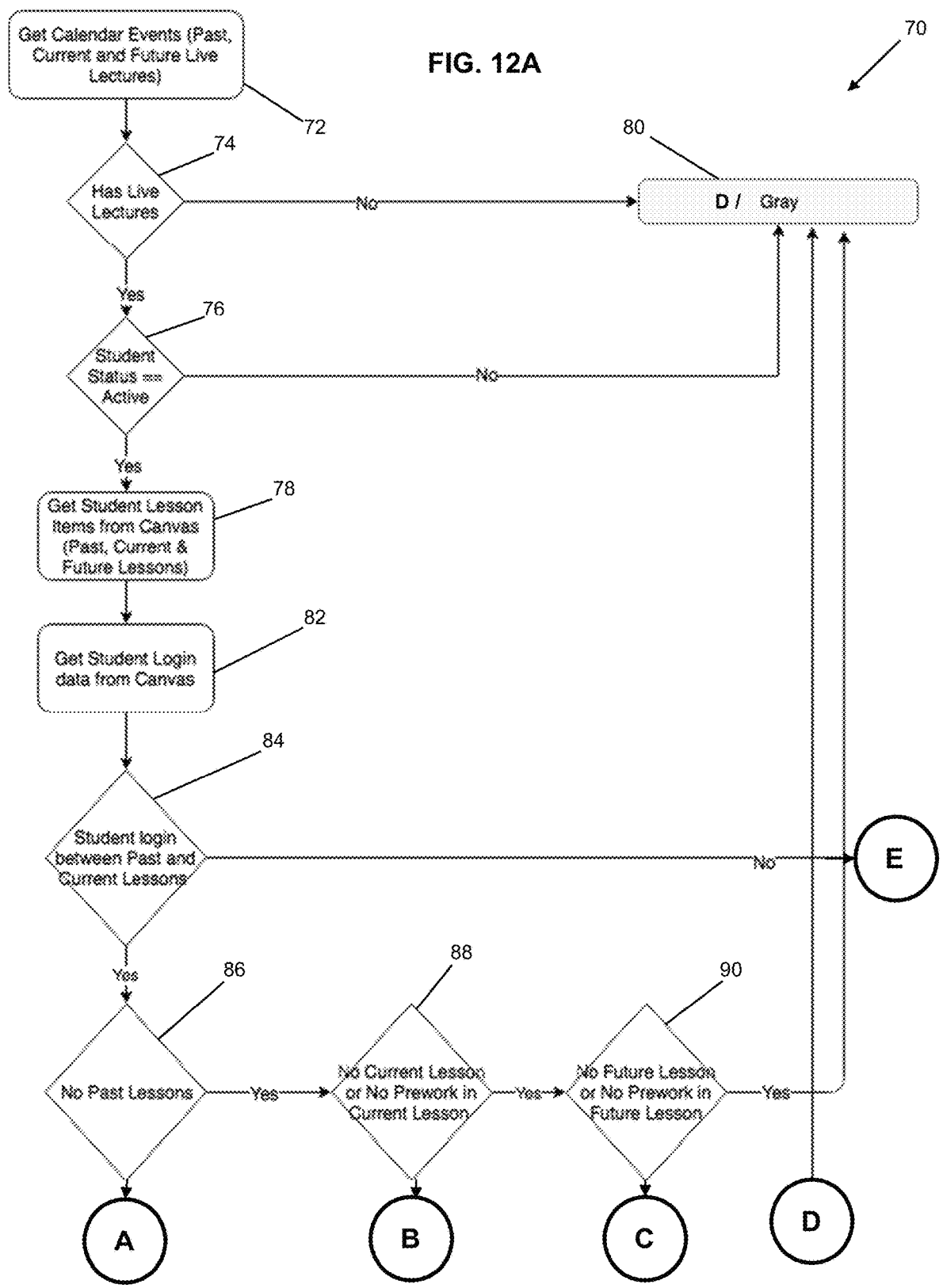
FIGS. 12A-12G together illustrate an exemplary process for determining a score for a student indicative of that student's use of digital media relating to a course.
Figure 12B:
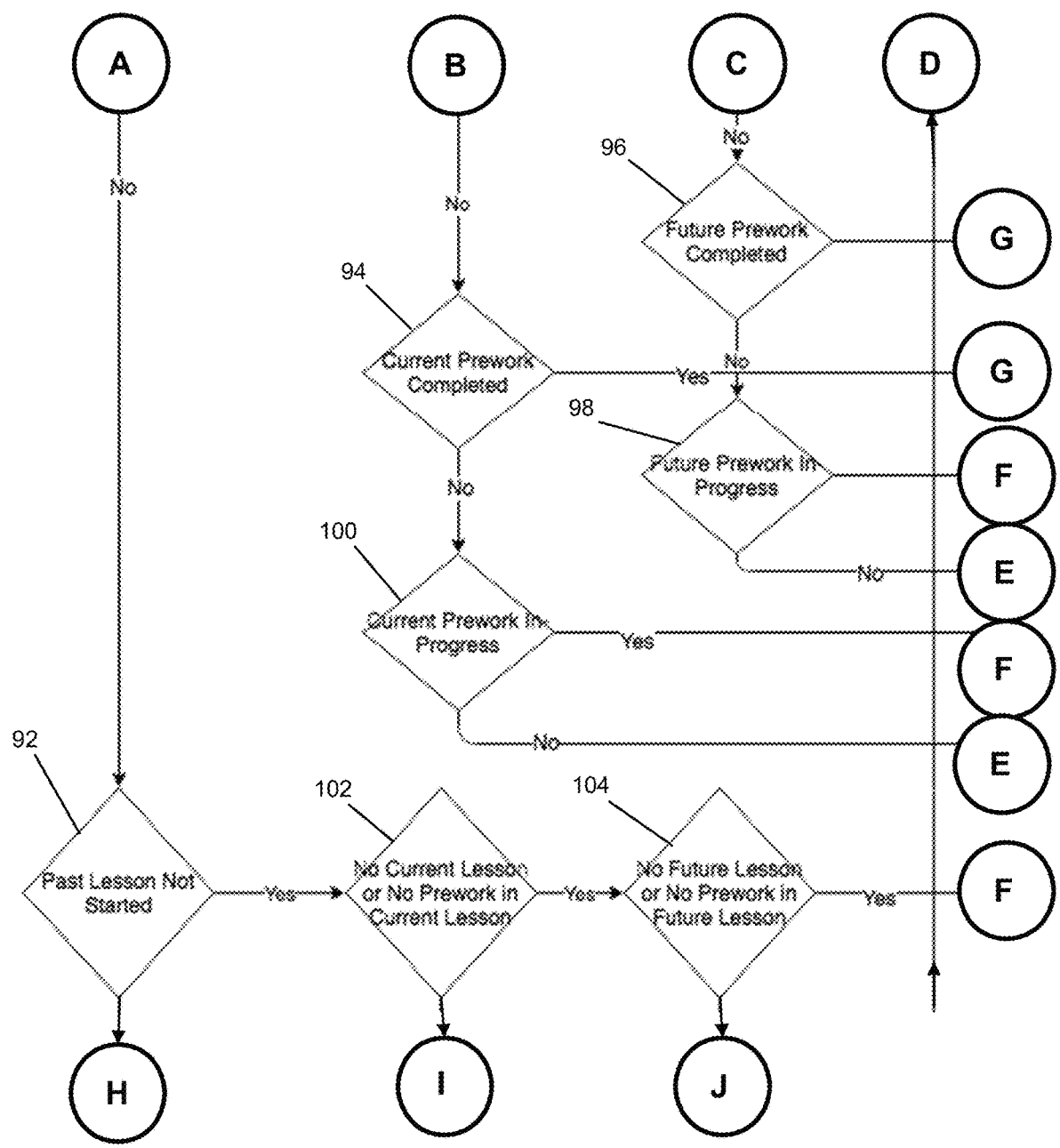
Figure 12C:
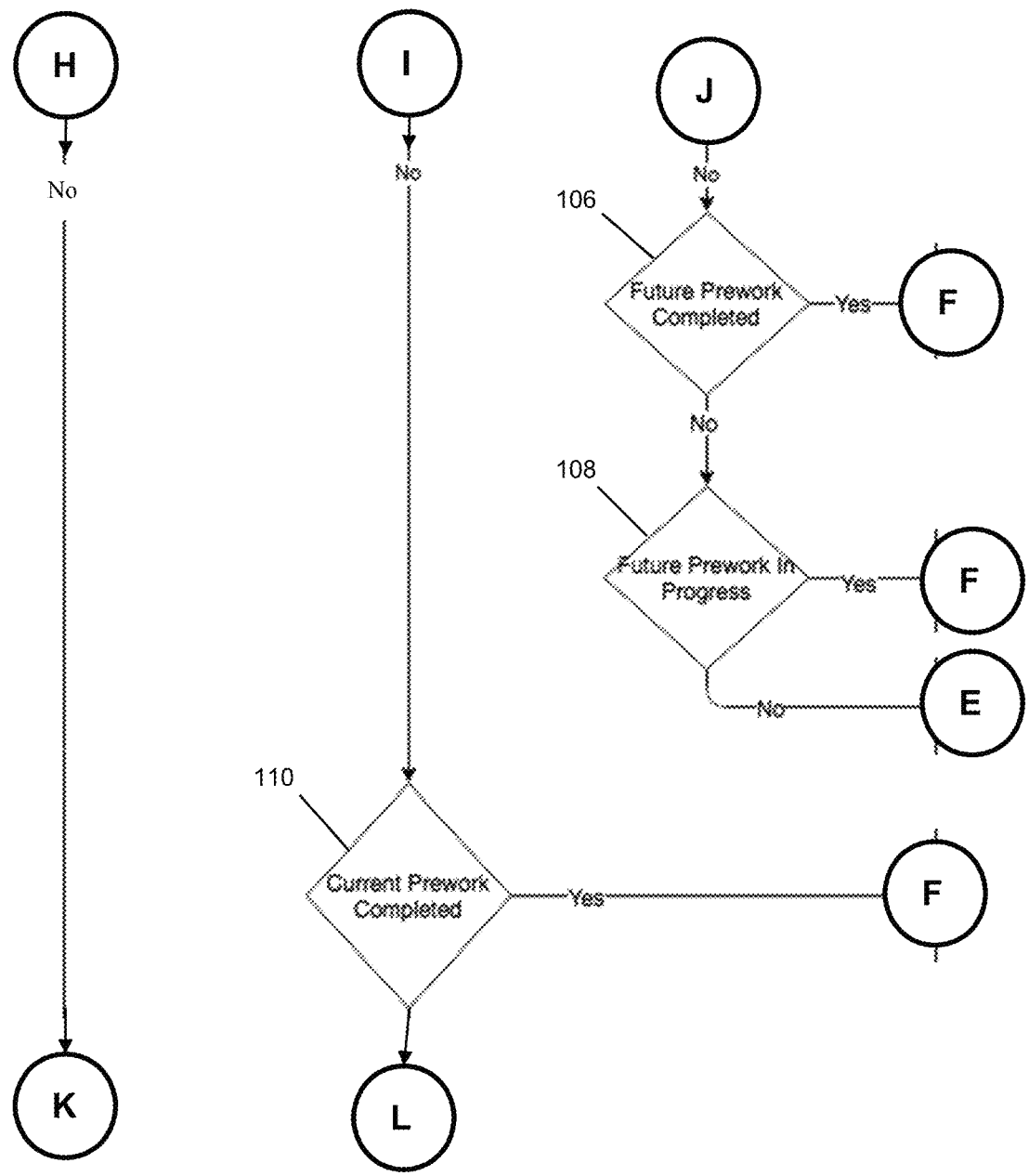
Figure 12D:
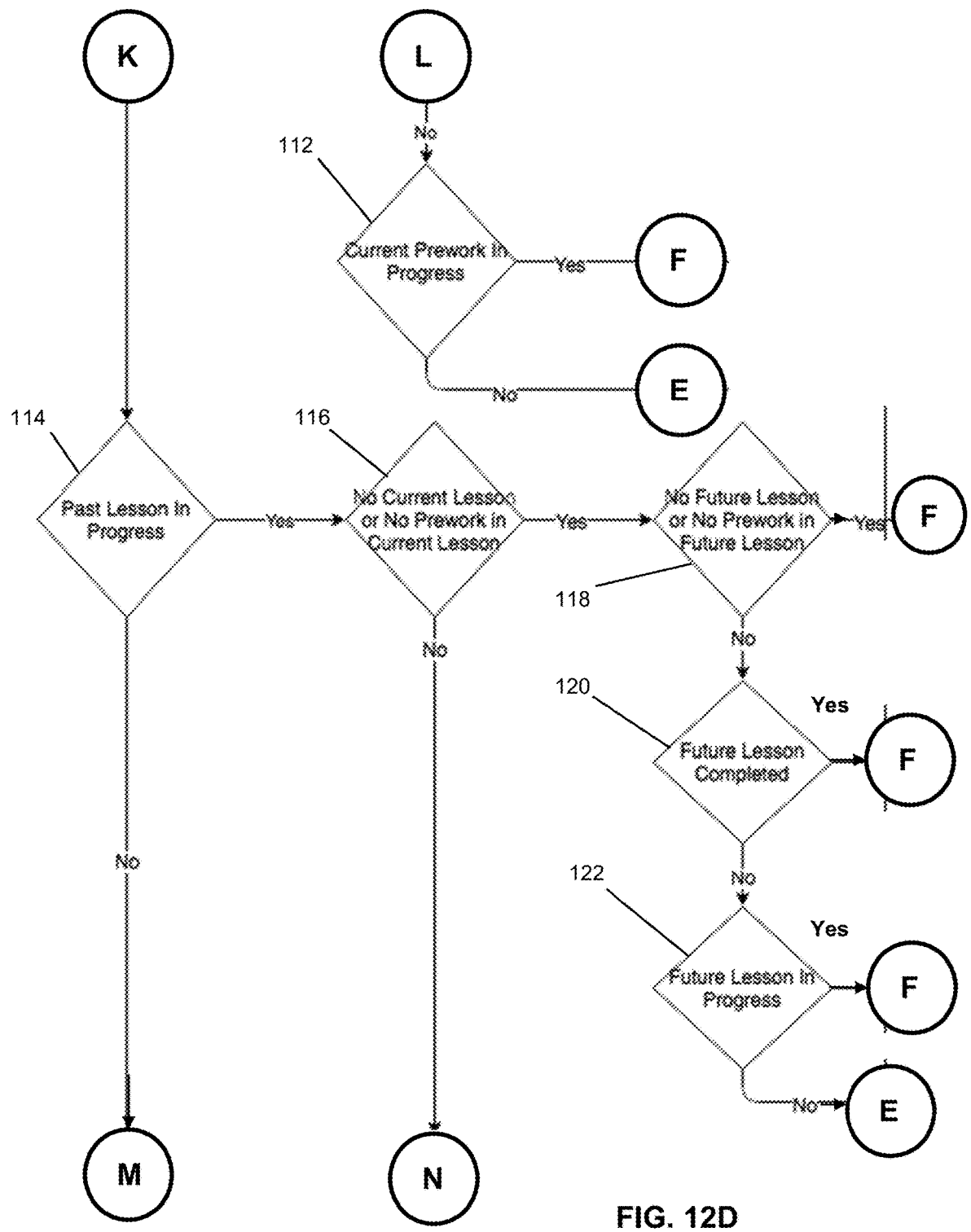
Figure 12E:
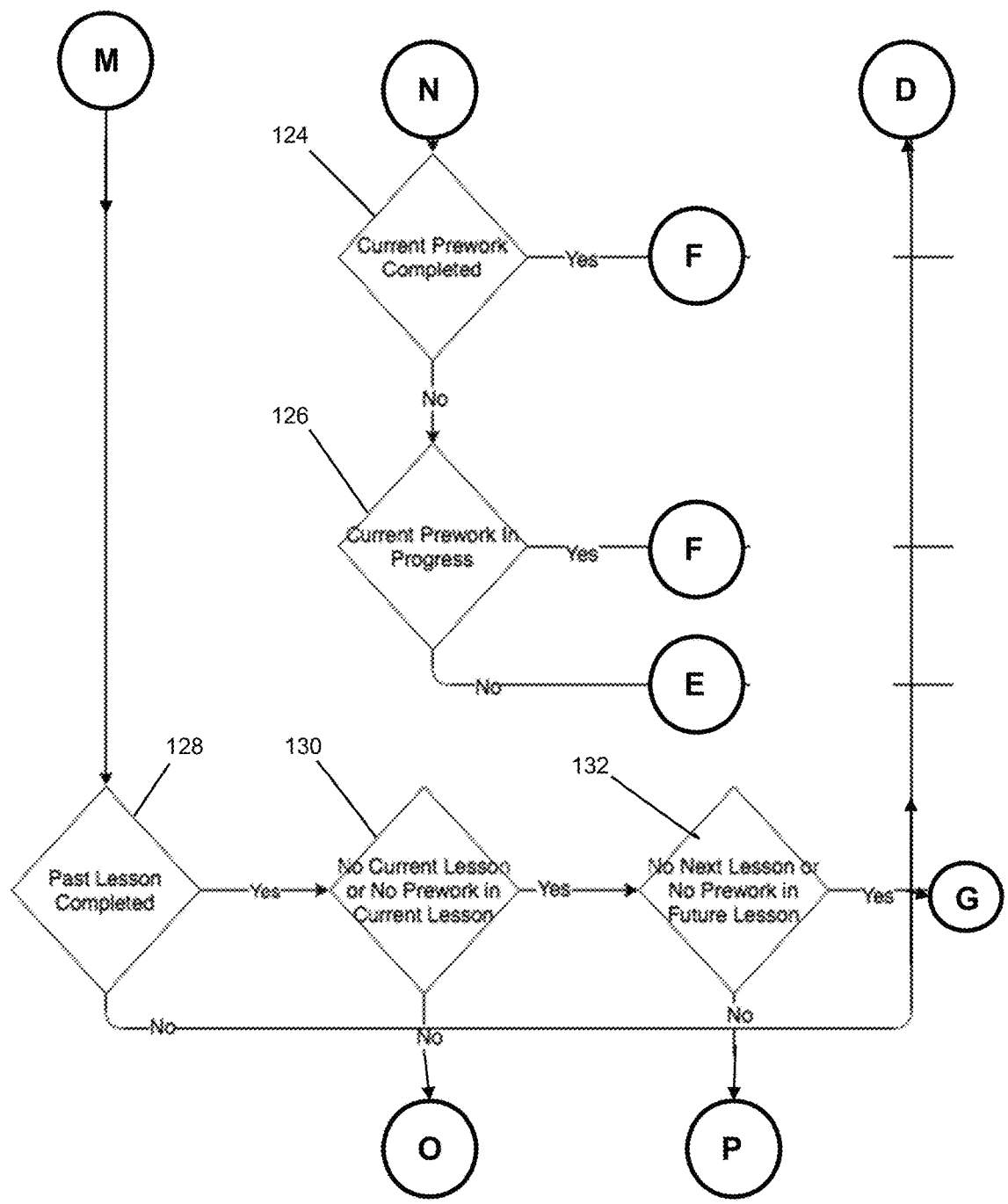
Figure 12F:
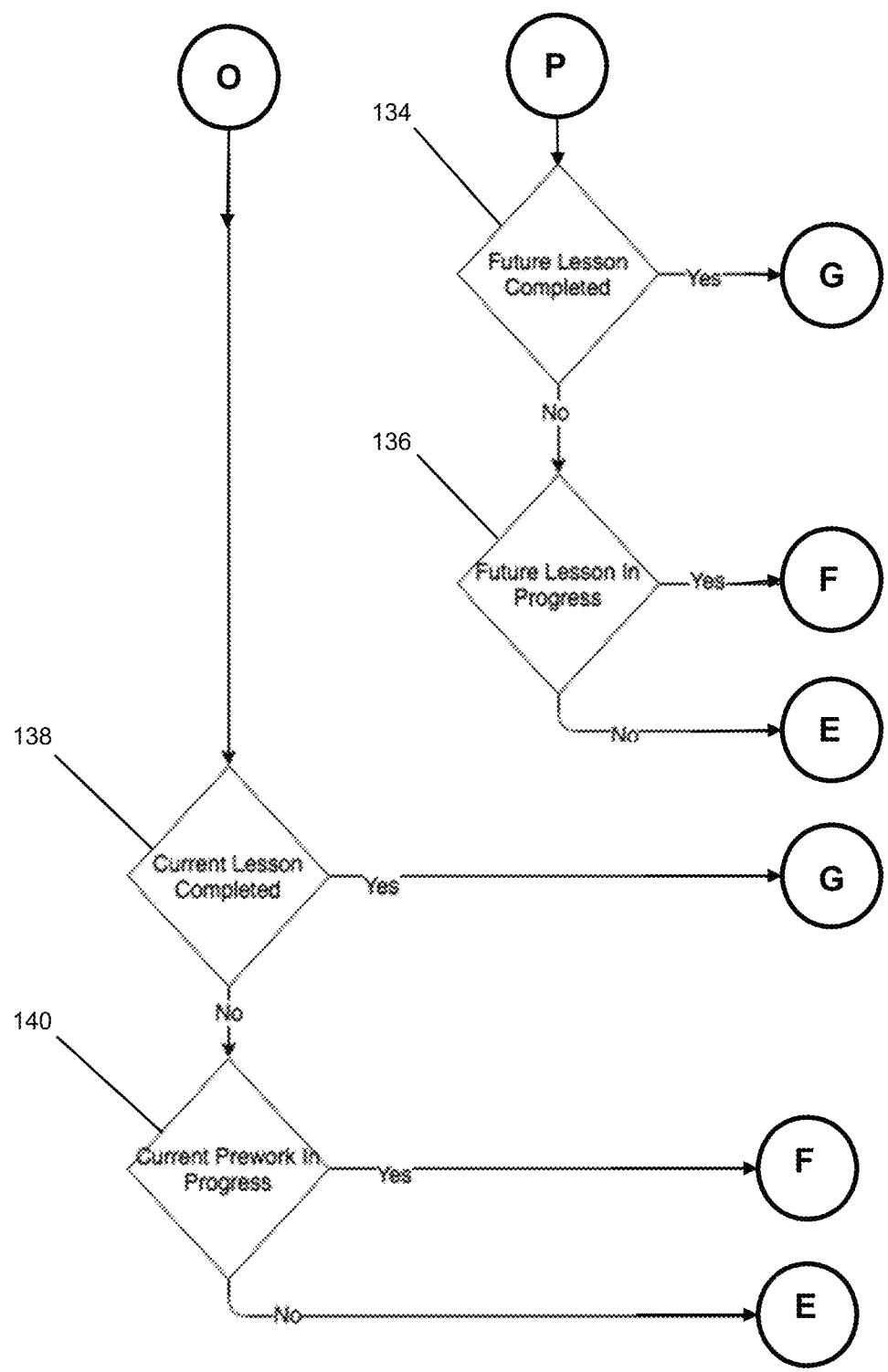
Figure 12G:
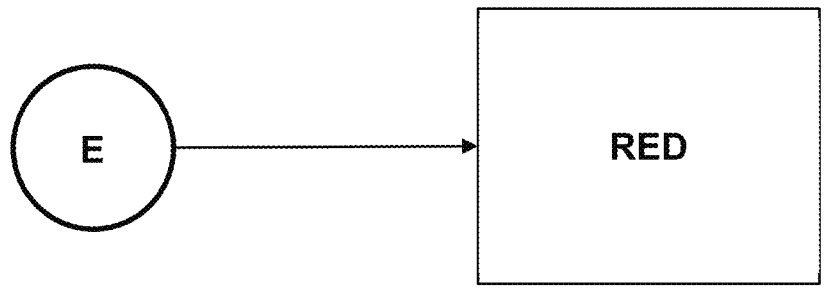
Figure 12G:
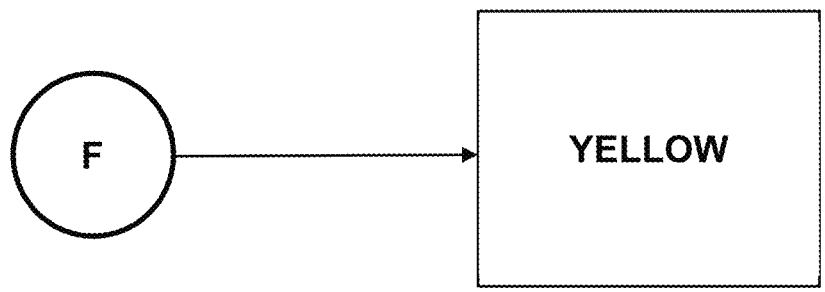
Figure 12G:
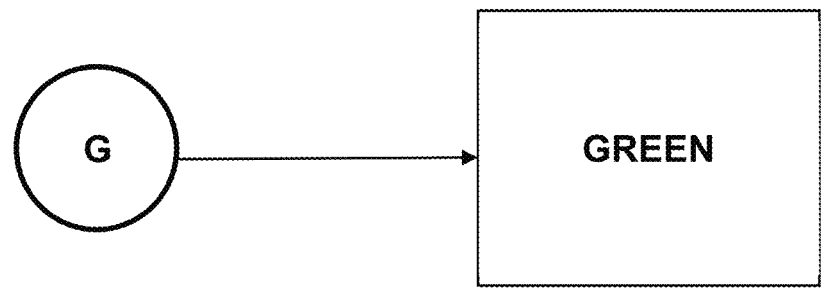

FIG. 12, including its sub-FIGS. 12A-12G, illustrates an exemplary process 70 for determining a 'digital' score ("D") for a student, that is, a score reflective of the student's use of digital resources that are required by, or otherwise associated with, the particular course, such as online texts, surveys, polls, viewing video, and the like. As with the P and A scores, the D score is assigned a color as indicated in FIGS. 12A and 12G, with the encircled "D" indicating assignment of the color Grey, "E" indicating assignment of the color Red, "F" indicating assignment of the color Yellow, and "G" indicating assignment of the color Green. The exemplary portions of the entire process of FIG. 12, detailed in FIGS. 12A-12G, are linked together with encircled letters in the customary fashion.

Beginning with reference to FIG. 12A, the process 70 begins by retrieving 72 data indicative of digital calendar events (e.g., past, current, and future live lectures) from a database, and then queries 74 whether or not there are any live lectures; if no, the student's D score is assigned the color grey. If yes at 74, the data is queried 76 to see if the student is active in the course; if no, the student's D score is assigned the color grey. If yes at 76, the process retrieves 78 student lesson items from a database (e.g., CANVAS), which can include past, present, and future lessons. Then, student login data is retrieved from a database (e.g., CANVAS). The process then queries 82 the login data to see if there has been a student login between the past and current lessons; if no, then the student's D score is set to Red. If yes at 84, the process then queries 86 is there are no past lessons; if yes, then the process queries 86 if there is no current lesson or no prework in the current lesson; if yes, the process then queries 90 if there is no future lesson or no prework in a future lesson; if yes, then the student's D score is assigned color grey.

Referring now to FIG. 12B, which is continuation of the logic flow from FIG. 12A, if the answer to query 86 is No, the process proceeds to query 92, which will be discussed below. When the query at 88 results in No, the process then queries 94 if the student's current paperwork is completed; if yes, then the student's D score is assigned Green. If No at 94, then the process queries 100 if the student's current prework is in-progress; if yes, the student's D score is assigned Yellow, if No the student's D score is assigned Red. If the query 90 results in No, then the process then queries 96 if future work is completed; if Yes, student's D score is assigned Green. If the query 96 returns No, then the process queries if future prework is in progress; if Yes, then student's D score is assigned Yellow, if No, student's D score is assigned Red.

Turning back to query 92, to which the process 70 flows from a No returned at query 86 (FIG. 12A), the data is queried if a past lesson has not been started. If Yes at 92, the process then queries 102 if there is no current lesson or no prework for a current lesson; if yes, the process then queries 104 if there is no future lesson or no prework in a future lesson; if yes, then the student's D score is assigned Yellow. If the query at 92 returns a No, the process continues in FIG. 12C to flow through to FIG. 12D. If the query at 102 returns a No, the process then queries 110 if the student's current prework has been completed; if Yes, then the student's D score is assigned Yellow. If the query at 104 returns No, the process then queries 106 if the student's future prework is completed; if Yes, then the student's D score is assigned Yellow. If No is returned at query 106, the process then queries if the student's future prework is in progress; if Yes, then the student's D score is assigned Yellow, if No, then the student's D score is assigned Red.

With reference to FIG. 12D, when the process returns No. at query 92 (FIG. 12B, flowing through FIG. 12C), the process then queries 114 if there is a past lesson in progress for the student; if No, the process flows through to FIG. 12E. If Yes is returned at query 114, the process then queries if there is no current lesson or no prework for a current lesson; if No is returned, the process flows through to FIG. 12E. If Yes is returned at query 116, the process then queries 118 if there is no future lesson or no prework in a future lesson; if Yes is returned, then the student's D score is assigned Yellow. If No is returned at query 118, the process then queries 120 if there is a future lesson completed; if Yes is returned, then the student's D score is assigned Yellow. If No is returned at query 120, the process then queries 122 if there is a future lesson in progress; if Yes is returned, then the student's D score is assigned Yellow; if No is returned, then the student's D score is assigned Red.

With reference to FIG. 12E, when the query 116 (FIG. 12D) returns No, then the process 70 queries 124 if the student's current prework is completed; if Yes is returned, then the student's D score is assigned Yellow. If query 124 returns No, the process then queries 126 if the current prework is in process; if Yes, then the student's D score is assigned Yellow; if No, then the student's D score is assigned Red. When query 114 (FIG. 12D) returns No, the process then queries 128 if the past lesson has been completed; if No is returned, then the student's D score is assigned Grey. If Yes is returned, the process then queries 130 if there is no current lesson or no prework in a current lesson; if No is returned, the process proceeds in FIG. 12F. If Yes is returned at 130, the process then queries 132 if there is no next lesson or no prework in a future lesson; if Yes is returned, then the student's D score is assigned Green; if No is returned, the process proceeds in FIG. 12F.

With reference to FIG. 12F, when No is returned at 130, the process then queries 138 if the current lesson is completed; if Yes is returned, then the student's D score is assigned Green. If No is returned at 138, then the process queries if the current prework is in progress; if Yes is returned, then the student's D score is assigned Yellow; if No is returned, then the student's D score is assigned Red. When No is returned at query 132 (FIG. 12E), the process then queries 134 if the future lesson is completed; if Yes is returned, then the student's D score is assigned Green. If No is returned at 134, the process queries 136 if a future lesson is in progress; if Yes is returned, then the student's D score is assigned Yellow; if No is returned, then the student's D score is assigned Red. FIG. 12G simply indicates that the encircled E, F, and G of FIGS. 12A-12F correspond to assignment of Red, Yellow, and Green, respectively, for the student's D score.

Figure 13:
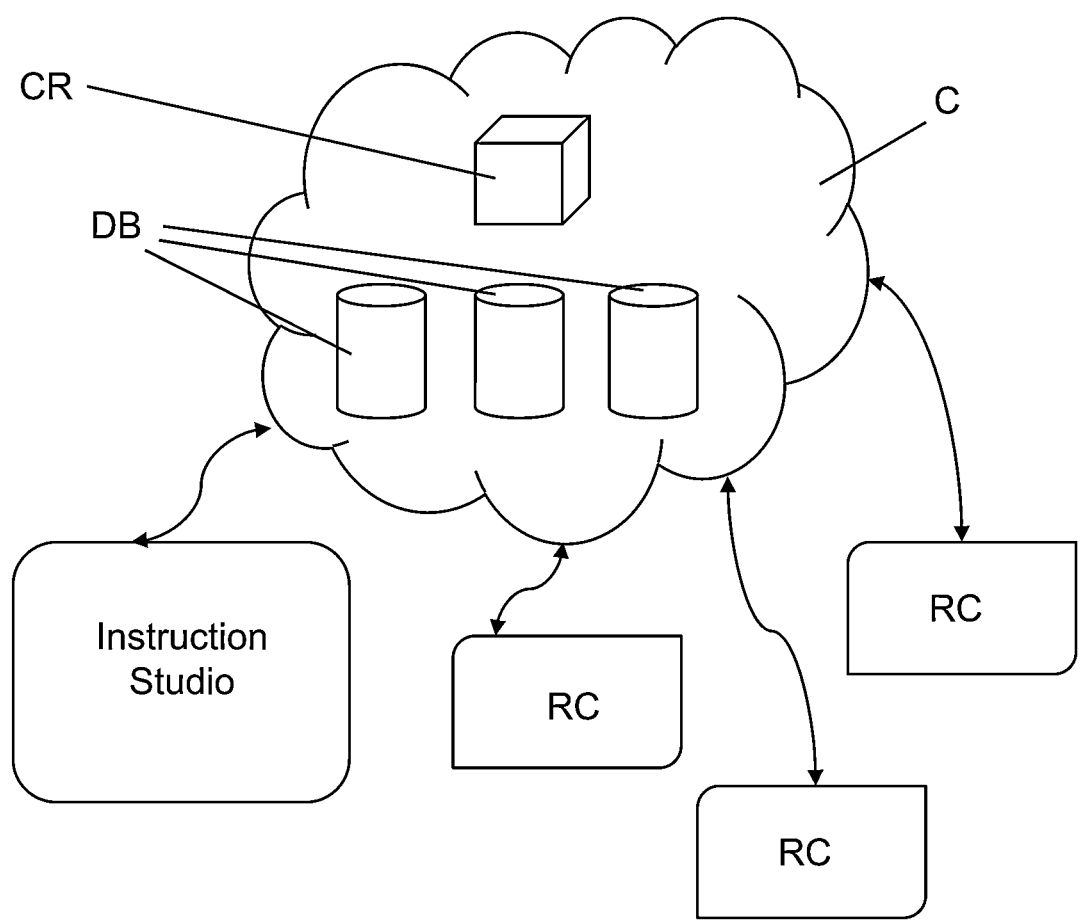
FIG. 13 illustrates a top-level view of an exemplary computing and data distribution environment.

FIG. 13 illustrates a top level view of an educational learning environment described herein, including an Instruction Studio, one or more Remote Classrooms RC, all in communication with preferably cloud-based computing and data storage environment C, which itself includes computing resources CR, and one or more databases DB. One or more sets or modules of logical instructions, which implement the processes described herein, are contained in memory of, or accessible by, the computing resources CR, and the computing resources are configured for performing operations in accordance with aspects of the present disclosure. The system includes, but is certainly not limited to, one or more storage servers communicatively coupled to one or more data storage modules, each of which includes, for example, multiple non-volatile mass storage devices. Also communicatively coupled to the host storage server(s) through a network interconnect are the Instruction Studio and the Remote Classrooms, to deliver image and/or audio data. The network interconnects may be, for example, a local area network (LAN), a wireless local area network (WLAN), a wide area network (WAN), a metropolitan area network (MAN), a global area network, a distributed computer system, such as the Internet, a Fiber Channel fabric, or any combination of such interconnects. The computing resources CR may take on various forms including, as some non-limiting examples, a server-class computer, a networked workstation, a personal computer (PC), a handheld computing device, and the like. It should be readily understood that the system illustrated in FIG. 13 is merely provided as an exemplary application by which the various inventive aspects and features of this disclosure can be applied. Moreover, only selected components of the system have been shown and have been described in additional detail. Nevertheless, the systems and devices discussed herein can include numerous additional and alternative features, and other well-known peripheral components, for example, for carrying out the various methods and functions disclosed herein.

While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the That which is claimed is:

1. A system for summarizing and presenting student participation level, academic performance, and use of digital learning resources in an academic course taught in a distance learning environment, the academic course having a course roster of a plurality of students enrolled in said academic course, the system comprising:
   a P-module configured to evaluate student participation data of the plurality of students enrolled in said academic course;
   an A-module configured to evaluate student academic performance data of the plurality of students enrolled in said academic course;
   a D-module configured to evaluate student use of digital learning resources data of the plurality of students enrolled in said academic course; and
   an attention indicator module configured to generate a display of data concerning at least one student of the plurality of students indicating intent to be called upon by an instructor of said academic course;
   wherein said attention indicator module generates two different and simultaneous displays, the two different and simultaneous displays including said at least one student of the plurality of students, a first of said two displays including P-, A-, and D-colors for said at least one student, and a second of said two displays not including P-, A-, and D-colors for said at least one student.

2. A system in accordance with claim 1, wherein each of said P-, A-, and D-modules assigns a color to said student based on each evaluation.

3. A system in accordance with claim 1, wherein said academic course has a total enrollment including the plurality of students enrolled, the system further comprising: a roster module configured to generate a display of the total enrollment in said academic course, including students from more than one remote classroom.

4. A system in accordance with claim 3, wherein said roster module is further configured to generate a display of a classroom roster in a single remote classroom.

5. A system in accordance with claim 1, wherein said attention indicator module is further configured to: display said first of said two displays including P-, A-, and D-colors for said at least one student only to an instructor of said academic course; and display said second of said two displays in a remote classroom to said students.

6. A system in accordance with claim 1, wherein said student academic performance data includes only data for said academic course.

7. A system in accordance with claim 1, further comprising:
   an instructor camera configured to stream image data of a course instructor; and wherein said first of said two displays is positioned immediately adjacent to said instructor camera, whereby when the course instructor looks at said instructor camera, said first of said two displays is a heads-up display for the course instructor.

8. A system in accordance with claim 1, wherein the P-module is configured to evaluate student participation data of the at least one student by retrieving data indicative of class calendar events, retrieving data indicative of participation in each of the class calendar events by the at least one student, retrieving participation settings, and processing the data indicative of class calendar events, the data indicative of participation in each of the class calendar events by the at least one student, and the participation settings to determine a P- score for the at least one student.

9. A system in accordance with claim 1, wherein the A-module is configured to evaluate student academic performance data of the at least one student by retrieving data indicative of grades of the at least one student in said academic course, retrieving data indicative of academic settings for said academic course, and processing the data indicative of the grades of the at least one student in said academic course and the data indicative of academic settings for said academic course to determine an A- score for the student.

10. A system in accordance with claim 1, wherein the D-module is configured to evaluate student use of digital learning resource data of the at least one student by retrieving data indicative of lessons of the at least one student, retrieving login activity of the at least one student, retrieving data indicative of prework of the at least one student, and processing the data indicative of lessons of the at least one student, the login activity of the at least one student, and the data indicative of prework of the at least one student to determine a D- score for the student.

11. A computerized method for summarizing and presenting participation level, academic performance, and use of digital learning resources of a student enrolled in an academic course taught in a distance learning environment, the course having a course roster, the method comprising:
   evaluating student participation data of the student by retrieving data indicative of class calendar events, retrieving data indicative of participation in each of the class calendar events by the student, retrieving participation settings, and processing the data indicative of class calendar events, the data indicative of participation in each of the calendar events by the student, and the participation settings to determine a P- score for the student;
   evaluating student academic performance data of the student by retrieving data indicative of grades of the student in said academic course, retrieving data indicative of academic settings for said academic course, and processing the data indicative of grades of the student in said academic course and the data indicative of academic settings for said academic course to determine an A- score for the student;
   evaluating student use of digital learning resources data of the student by retrieving data indicative of lessons of the student, retrieving login activity of the student, retrieving data indicative of prework of the student, and processing the data indicative of lessons of the student, the login activity of the student, and the data indicative of prework of the student to determine a D- score for the student; and
   outputting two different and simultaneous displays, a first of said two displays including P-, A-, and D- colors corresponding to the P-, A-, and D- scores for the student, a first of said two displays including the P-, A-, and D- colors for the student, and a second of said two displays not including P-, A-, and D- colors for said at least one student.

* * * * *